Patented Feb. 6, 1934

1,945,869

UNITED STATES PATENT OFFICE 1,945,869

BITUMINOUS PAINT AND METHOD OF MAKING THE SAME

Samuel W. Sparks, Bellevue, Pa., assignor of one-third to Robert T. Lytle and one-third to Lawrence W. Stofiel, both of Pittsburgh, Pa., and one-third to Price S. McPherson, Bellevue, Pa.

No Drawing. Application April 12, 1933
Serial No. 665,759

6 Claims. (Cl. 134—51)

This invention relates to bituminous paint and to the method of making the same. The present application is a continuation-in-part of my co-pending application Serial No. 639,487, filed October 25, 1932. The invention relates more particularly to the method and the paint made from bituminous rock such as is found in Kentucky, Alabama, Georgia and other parts of the world. This bituminous rock is a natural deposit known under such names as "bituminous rock" and "rock asphalt" and is associated with deposits of lime, sand, bluestone and clays. This bituminous material will be referred to hereinafter as "bituminous rock". It may contain from 20 to 50% silica or even greater amounts. The remainder consists essentially of asphalt, and light and heavy natural oils from which naphthas, gasoline, and paraffin wax may be obtained. The bituminous material constitutes about 12% of the rock, although this will vary somewhat in different rocks. The bituminous rock which I prefer to use in producing paint in accordance with this invention is of the type which is now used for making roads, wherein the rock is crushed, then laid on the road bed, and then rolled cold without the addition of any binding material. The specifications for rock to be used in making roads generally provide that the bituminous content shall be between 6 and 7%. The bituminous rock which I employ in making paint differs radically from other forms of bitumen such, for example, as gilsonite or petroleum asphalt which contain no silica. I use the bituminous rock in its naturally occurring state without prior treatment to remove silica, hydrocarbon oils, or any of the constituents originally present in the rock. It is believed that the silica and the oils present in the naturally occurring bituminous rock impart to paint made therefrom the superior properties over paint made from other forms of bituminous material in which silica and oils do not occur or have been removed prior to their use in making paint. Paint produced from bituminous rock in accordance with the present invention is superior to that produced from any other bituminous material of which I am aware.

A specific illustration of the method by which the bituminous rock may be converted into a paint, enamel, lacquer or the like is as follows: The rock is crushed in any suitable manner and the crushed rock is treated with nitric acid in the proportion of about 20 pounds of the rock to 40 ounces by volume of nitric acid. A closed container is preferably used in this treatment so that the fumes of the nitric acid will have an opportunity to react with the bituminous rock. The mixture is allowed to stand for a time sufficient to disintegrate the rock, which period is generally in the neighborhood of 12 hours. The nitric acid disintegrates or breaks down the rock, but does not dissolve it to any appreciable extent. After the rock has been disintegrated by the nitric acid treatment, sulphuric acid is added to the mixture in the amount of about 116 ounces by volume of 1.42 specific gravity acid. The sulphuric acid reacts with the bituminous rock and in about 3 to 5 minutes after the addition of the acid, the mixture begins to boil strongly. The bituminous rock is first converted into a mushy condition and thereafter becomes more liquid as the reaction proceeds. The acid should be added slowly while stirring, the amount of acid used depending somewhat upon the analysis of the particular rock and the strength of the acid. As the reaction proceeds, the mixture becomes more liquid, and at the end of about 1½ to 2 hours, it has reached a point where the greater part of the reaction has taken place, but there is still some reaction occurring, as is evidenced by some boiling or bubbling of the mixture. At this point, while the mixture is still warm and before the reaction of the acid with the bituminous rock has been completed, about 38 ounces by volume of collodion are added and the mixture is stirred. The addition of the collodion creates more heat, which reaction is shown by increased boiling and a rise in temperature, although the reaction is not as violent as in the first stages after the sulphuric acid was originally added to the bituminous rock. The reaction of the acid and the bituminous rock continues after the addition of the collodion, the mixture giving off bubbles continuously. The reaction is aided by agitating it at intervals of about an hour for a period of about 12 hours or more until the reaction has been completed. All of the solid matter, including the silica originally present in the bituminous rock, is converted in this manner into a liquid paint which is free from acid. The neutral character of the finished paint is shown by the fact that when it is applied to a cloth it will not weaken it, whereas if a sample of the paint is taken before the reaction has been completed and is applied to a cloth, it will either eat through it imediately or else weaken it to such an extent that it can be easily torn.

Care should be taken not to add an excess of acid to the bituminous rock, since if an excess is used or is added too quickly, it has a tendency to produce a product having a brown or purple color. If the correct amount of acid is used and is added slowly to the bituminous rock while agitating it, the paint so produced is jet black in color.

The collodion is added before the reaction between the bituminous rock and acid has been completed. If it is attempted to complete the reaction between the bituminous rock and the acid and then add the collodion, it has been found that a paste is produced instead of a liquid, the paste being stringy in nature and not suitable for use as a paint. Furthermore, some undissolved silica remains in the paste. On the other hand, when the collodion is added before the reaction of the bituminous rock and the acid has been completed, all of the silica originally present in the rock is converted into a liquid and the paint so produced is of the proper consistency for application in the usual manner.

The term "paint" is used herein as a term of general definition to include paints, enamels, lacquers and the like, waterproofing and other plastic compositions.

The paint may be applied by brushing, dipping, spraying, or other methods to all kinds of materials. Tests have been made on wood, glass, iron, steel, aluminum, rubber, leather, cloth, concrete, tin, copper, brass, lead, plaster, and paper, and it has been found that the paint provides a superior coating on any of these materials without preliminary treatment of the surface to which the paint is applied.

The paint has been applied to thin sheet steel and the sheet has been bent double many times without cracking the paint. The same test has been made on rubber with similar results. The rubber having the paint applied thereto can be stretched and although upon stretching the rubber the paint will crack somewhat, when the tension is released from the rubber, the paint will still adhere thereto and no substantial cracks are visible. The paint has been applied to one side of a piece of sheet steel and a blow torch has been directed against the other side of the sheet so as to raise the temperature of the sheet to a red heat. The paint immediately opposite the point of application of the blow torch was melted, but the paint at all other points on the sheet was found to have retained its luster, hardness, and durability after the sheet had cooled. It has been applied to the manifold of an automobile and has been found to retain its luster at the temperatures encountered even after several months use. It has been applied as a waterproofing compound or top dressing to automobile tops in place of the usual top dressing used for this purpose and has been found very satisfactory, and has been found entirely suitable as an insulating coating for electric conductors and connections. It has a less tendency to crack than any other known materials of which I am aware when subjected to different temperatures which would cause the surface on which the paint is applied to expand or contract. It is insoluble in gasoline, and although certain paint removers will soften it temporarily, it will harden again after the paint remover has volatilized. It does not corrode metal nor weaken cloth, rubber or other fabrics since the acid is exhausted by the reaction with the bituminous rock.

I have given the proportions of the constituents which I prefer to use in making the paint and have described in detail the preferred method. It is to be understood, however, that the proportions of acid and collodion may be varied somewhat from those given and that the invention may be otherwise embodied or practiced within the scope of the following claims.

1. Bituminous paint comprising the reaction product of bituminous rock, nitric acid, sulphuric acid, and collodion.

2. Bituminous paint containing the reaction product of the following constituents in about the proportions of 20 pounds bituminous rock, about 40 ounces by volume of nitric acid, about 116 ounces by volume of 1.42 specific gravity sulphuric acid, and collodion.

3. Bituminous paint containing the reaction product of the following constituents in about the proportions of 20 pounds bituminous rock, about 40 ounces by volume of nitric acid, about 116 ounces by volume of 1.42 specific gravity sulphuric acid, and about 38 ounces by volume of collodion.

4. The method of making bituminous paint, comprising mixing bituminous rock and nitric acid, thereafter adding sulphuric acid to the mixture, and adding collodion thereto before the reaction has been completed.

5. The method of making bituminous paint, comprising mixing bituminous rock and nitric acid and sealing the mixture from the atmosphere, thereafter adding sulphuric acid to the mixture, and adding collodion thereto before the reaction has been completed.

6. Bituminous paint comprising the reaction product of bituminous black rock of the characteristics of rock found in Logan County, Kentucky, nitric acid, sulphuric acid, and collodion.

SAMUEL W. SPARKS.